United States Patent [19]
Senoo

[11] Patent Number: 5,900,711
[45] Date of Patent: May 4, 1999

[54] STEPPING MOTOR DRIVING APPARATUS

[75] Inventor: Masakazu Senoo, Yonago, Japan

[73] Assignee: Matsushita Electric Industrial Co., Ltd., Osaka, Japan

[21] Appl. No.: 09/093,180

[22] Filed: Jun. 8, 1998

[30] Foreign Application Priority Data

Jun. 27, 1997 [JP] Japan ..................................... 9-171412

[51] Int. Cl.$^6$ ..................................................... H02P 8/00
[52] U.S. Cl. ........................... 318/696; 318/599; 318/603
[58] Field of Search .................................... 318/685, 696, 318/599–603; 29/593, 595; 324/160–163, 166–168; 73/2, 490, 506, 507, 530, 531; 235/95 R

[56] References Cited

U.S. PATENT DOCUMENTS

| | | | |
|---|---|---|---|
| 4,827,200 | 5/1989 | Ogura et al. .............................. | 318/561 |
| 5,252,903 | 10/1993 | Maruyama ................................ | 318/696 |
| 5,333,371 | 8/1994 | Mittenbuhler et al. .................... | 29/595 |
| 5,418,443 | 5/1995 | Kikuchi .................................... | 318/807 |
| 5,466,997 | 11/1995 | Utenick et al. .......................... | 318/254 |
| 5,532,567 | 7/1996 | Iwasaki et al. .......................... | 318/701 |
| 5,723,964 | 3/1998 | Nakaba .................................... | 318/599 |

FOREIGN PATENT DOCUMENTS 6-38593  2/1994  Japan .

*Primary Examiner*—Brian Sircus
*Attorney, Agent, or Firm*—Wenderoth, Lind & Ponack, L.L.P.

[57] ABSTRACT

A stepping motor driving apparatus comprising: a stepping motor; a pointer which is operatively associated with rotation of the stepping motor; a sensor for detecting a stop position of the stepping motor; an updown counter for outputting a count corresponding to a position of a rotor of the stepping motor; a ROM for storing data on an excitation signal corresponding to the count of the updown counter; a digital-to-analog converter for converting the data of the ROM into a voltage signal; a drive amplifier for amplifying the voltage signal of the digital-to-analog converter so as to drive the stepping motor; a NAND circuit which seeks a non-conjunction of a sensor signal from the sensor and a signal outputted, when the count of the updown counter is "0", by the updown counter so as to output a mask signal; and an AND circuit which seeks a logical product of the mask signal of the NAND circuit and a clock signal inputted from outside so as to output a drive clock signal to the updown counter.

1 Claim, 4 Drawing Sheets

STEPPING MOTOR DRIVING APPARATUS

BACKGROUND OF THE INVENTION

1. Field of the Invention

The present invention relates to a stepping motor driving apparatus used in an office automation appliance, a communication equipment, an audio appliance, a measuring instrument, etc.

2. Description of the Prior Art

A stepping motor driving apparatus is known from, for example, Japanese Patent Laid-Open Publication No. 6-38593 (1994). FIG. 3 shows an arrangement of this known stepping motor driving apparatus. The known stepping motor driving apparatus includes a stepping motor 1, a pointer 2 associated operatively with rotation of the stepping motor 1, a stopper 3 for stopping the stepping motor 1, an updown counter 4 for counting up or down step signals in accordance with rotational direction of the stepping motor 1, a ROM 5 for storing data on an excitation signal corresponding to a count of the updown counter 4, a digital-to-analog converter 6 for converting the data of the ROM 5 into a voltage signal and a drive amplifier 7 for driving the stepping motor 1 by amplifying the voltage of the digital-to-analog converter 6.

In FIG. 4 illustrating a speedometer of the known stepping motor driving apparatus by way of example, the pointer 2 of the stepping motor 1 is displaceable through a stroke angle S between an initial position A of an angular scale "0" and a final position B of a maximum angular scale "200" and the stopper 3 is disposed at the initial position A. When the stepping motor 1 is, for example, reset after power failure, the pointer 2 is returned to the initial position A. If a rotational position C of the stepping motor 1 is not known at this time, the stepping motor 1 is rotated counterclockwise towards the stopper 3 through a predetermined angle not less than the stroke angle S and thus, the stepping motor 1 can be stopped at the initial position A by the stopper 3. However, at this time, such a problem arises that since the predetermined angle not less than the stroke angle S is larger than an angle required actually for stopping the stepping motor 1 at the initial position A, i.e., an angle from the rotational position C to the initial position A, the pointer 2 is vibrated at the stopper 3.

SUMMARY OF THE INVENTION

Accordingly, an essential object of the present invention is to provide, with a view to eliminating the above mentioned drawback of prior art, a stepping motor driving apparatus having a simple arrangement, in which a stepping motor can be stopped at an initial position at all times.

In order to accomplish this object of the present invention, a stepping motor driving apparatus of the present invention comprises: a stepping motor; a pointer which is operatively associated with rotation of the stepping motor; a sensor for detecting a stop position of the stepping motor; an updown counter for outputting a count corresponding to a position of a rotor of the stepping motor; a ROM for storing data on an excitation signal corresponding to the count of the updown counter; a digital-to-analog converter for converting the data of the ROM into a voltage signal; a drive amplifier for amplifying the voltage signal of the digital-to-analog converter so as to drive the stepping motor; a NAND circuit which seeks a non-conjunction of a sensor signal from the sensor and a signal outputted, when the count of the updown counter is "0", by the updown counter so as to output a mask signal; and an AND circuit which seeks a logical product of the mask signal of the NAND circuit and a clock signal inputted from outside so as to output a drive clock signal to the updown counter.

In the stepping motor driving apparatus of the present invention, the external clock signal for driving the stepping motor is masked by the mask signal obtained by seeking the non-conjunction of the count of the updown counter and the sensor signal such that the stepping motor is stopped at an initial position.

Therefore, in accordance with the present invention, the stepping motor can be stopped at the initial position at all times without being vibrated.

BRIEF DESCRIPTION OF THE DRAWINGS

This object and features of the present invention will become apparent from the following description taken in conjunction with a preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE EMBODIMENTS

Figure 1:
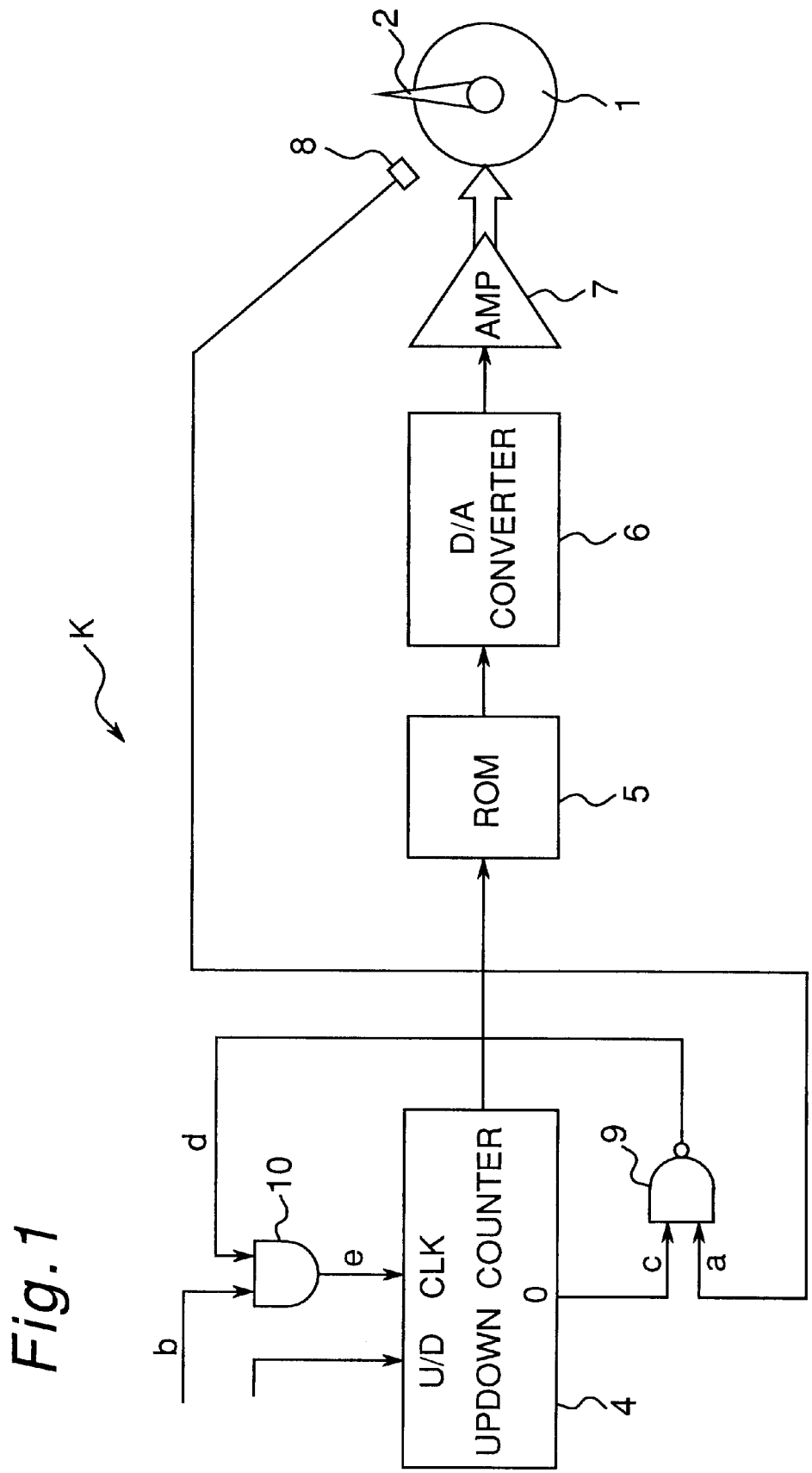
FIG. 1 is a block diagram of a stepping motor driving apparatus according to one embodiment of the present invention.
Figure 2:
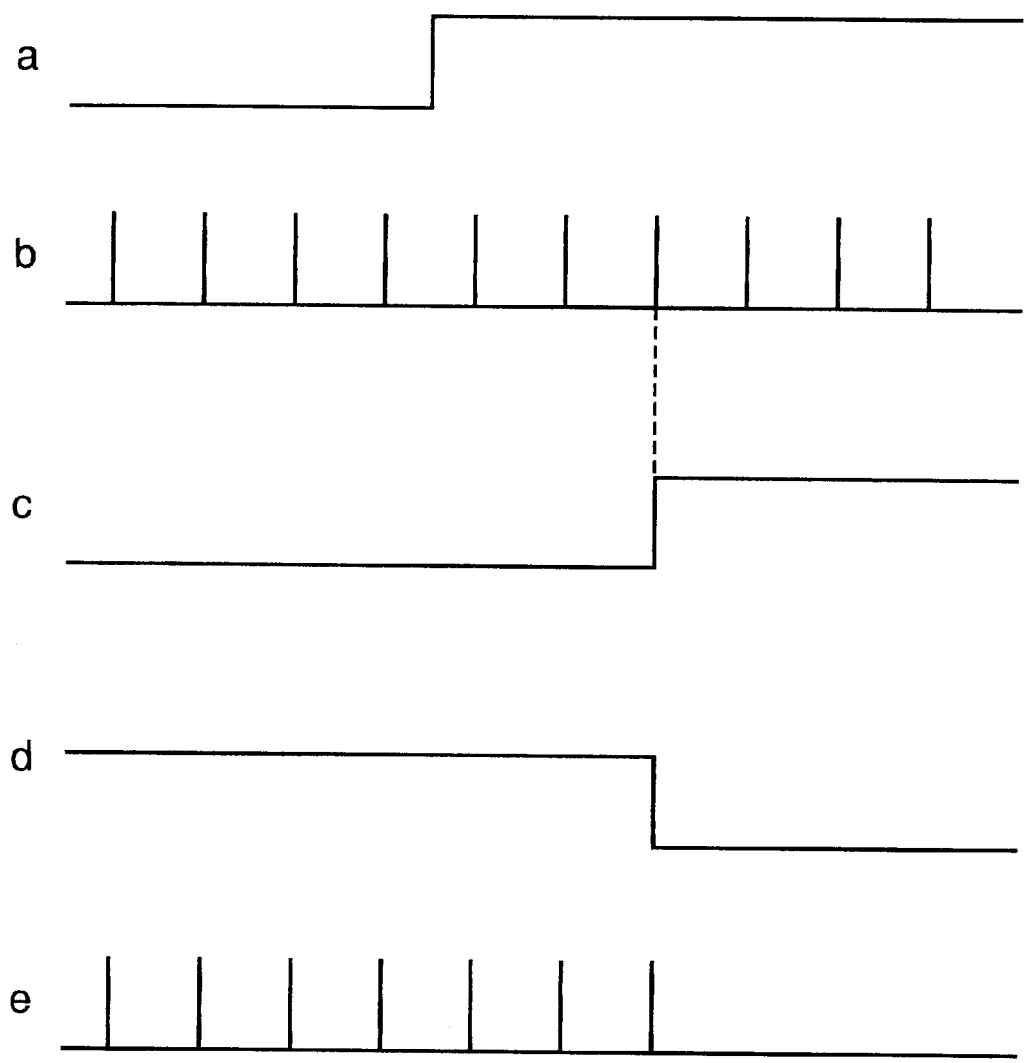
FIG. 2 is a diagram showing signals for actuating the stepping motor driving apparatus of FIG. 1.

FIG. 1 shows a stepping motor driving apparatus K according to one embodiment of the present invention and FIG. 2 shows signals for actuating the stepping motor driving apparatus K. In the same manner as the known stepping motor driving apparatus of FIG. 3, the stepping motor driving apparatus K includes a stepping motor 1, a pointer 2 associated operatively with rotation of the stepping motor 1, an updown counter 4 for counting up or down step signals in accordance with rotational direction of the stepping motor 1, a ROM 5 for storing data on an excitation signal corresponding to a count of the updown counter 4, a digital-to-analog converter 6 for converting the data of the ROM 5 into a voltage signal and a drive amplifier 7 for driving the stepping motor 1 by amplifying the voltage of the digital-to-analog converter 6.

Figure 3:
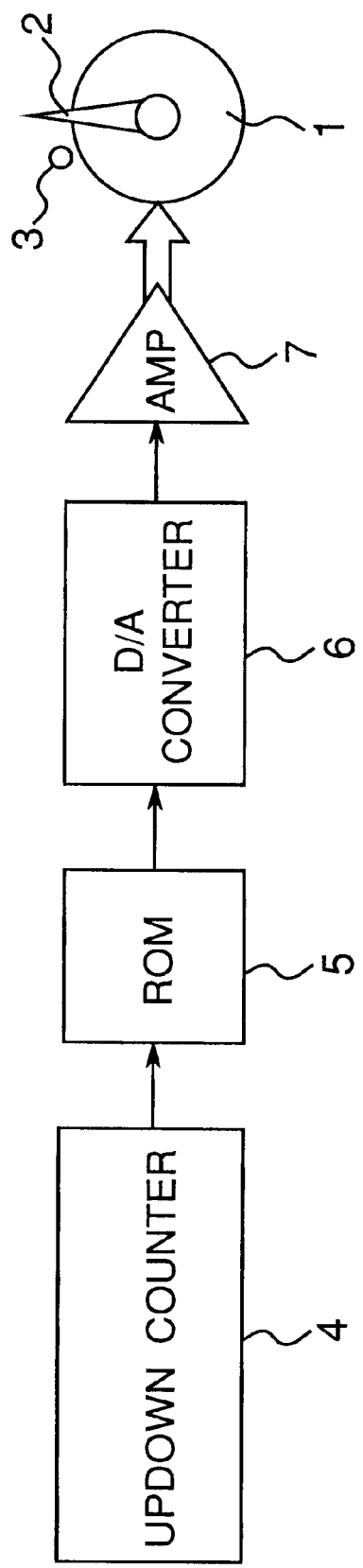
FIG. 3 is a block diagram of a prior art stepping motor driving apparatus.
Figure 4:
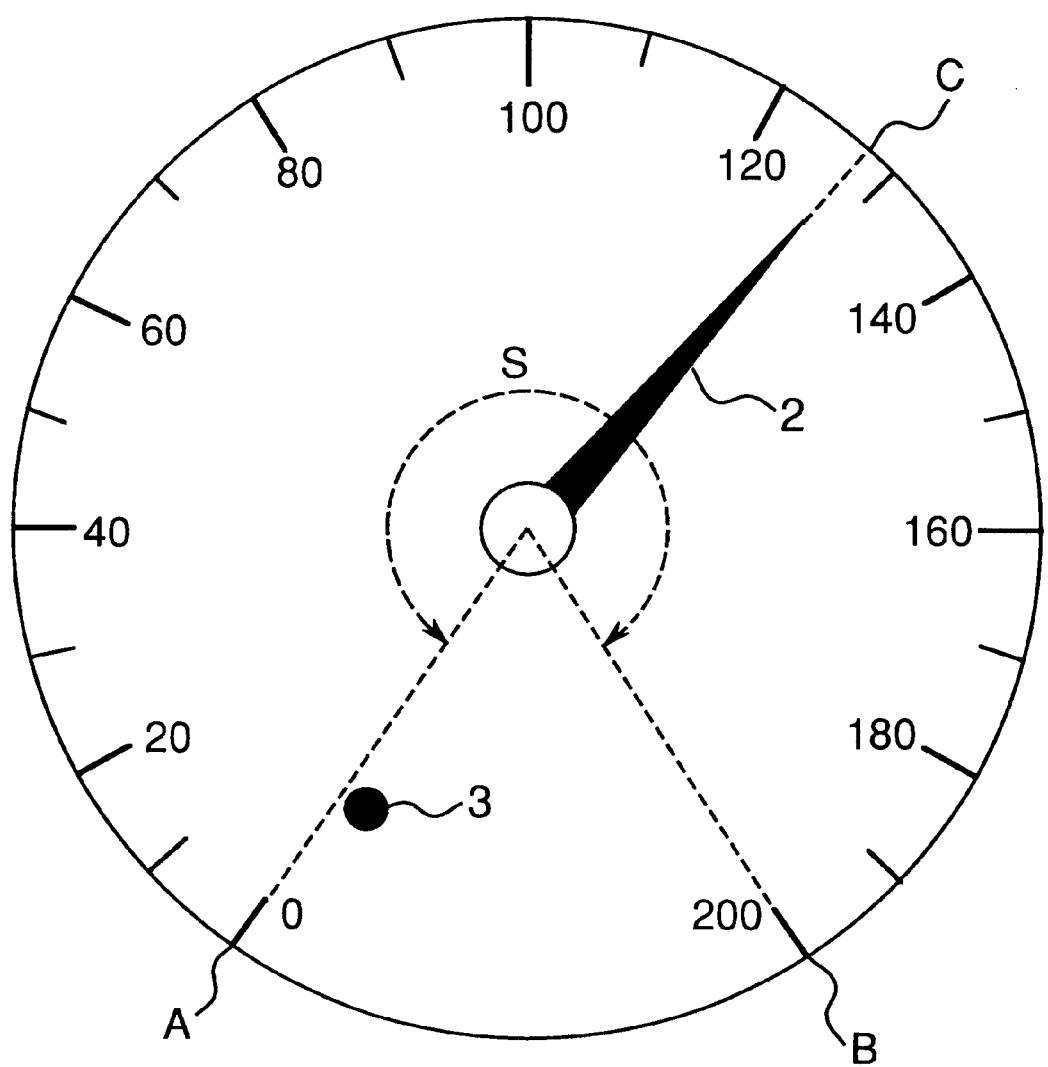
FIG. 4 is a schematic view of a speedometer of the prior art stepping motor driving apparatus of FIG. 3.

In the stepping motor driving apparatus K, the stopper 3 of the conventional stepping motor driving apparatus of FIG. 3 is replaced by a sensor 8 for detecting a stop position of the stepping motor 1, a NAND circuit 9 and an AND circuit 10. By seeking a non-conjunction of a detection signal a of the sensor 8 and a "zero" signal c outputted by the updown counter 4 when the count of the updown counter 4 is "0", the NAND circuit 9 outputs a mask signal d to the AND circuit 10. Meanwhile, the AND circuit 10 seeks a logical product of the mask signal d from the NAND circuit 9 and an external clock signal b so as to output a drive clock signal e to the updown counter 4.

Hereinafter, operation of the stepping motor driving apparatus K of the above described arrangement is described with reference to FIG. 2. When the stepping motor 1 is, for example, reset after power failure, the external clock signal b for rotating the stepping motor 1 to an initial position is initially inputted to the updown counter 4. The ROM 5 outputs to the digital-to-analog converter 6 the data corresponding to the count of the updown counter 4. An output voltage of the digital-to-analog converter 6 is amplified by the drive amplifier 7 so as to be delivered to the stepping motor 1. Therefore, the stepping motor 1 is rotated towards the initial position and thus, the sensor 8 detects the stop position of the stepping motor 1 so as to output the sensor signal a to the NAND circuit 9. Then, the NAND circuit 9 seeks the non-conjunction of the sensor signal a of the sensor 8 and the "zero" signal c of the updown counter 4 so as to detect the initial position and outputs the mask signal d to the AND circuit 10. Subsequently, the AND circuit 10 seeks the logical product of the mask signal d of the NAND circuit 9 and the external clock signal b so as to output the drive clock signal e to the updown counter 4.

Consequently, by using the mask signal d of the NAND circuit 9 which seeks the non-conjunction of the "zero" signal c of the updown counter 4 and the sensor signal a of the sensor 8, the AND circuit 10 masks the external clock signal b so as to stop operation of the updown counter 4. As a result, the stepping motor 1 is stopped at the initial position at all times.

As is clear from the foregoing description of the stepping motor driving apparatus of the present invention, such an advantageous effect can be gained that even if the stepping motor should be stopped at the initial position when an external microcomputer or the like has failed to trace a rotational position of the stepping motor, the stepping motor can be stopped at the initial position without being vibrated.

What is claimed is:

1. A stepping motor driving apparatus comprising:

a stepping motor;

a pointer which is operatively associated with rotation of the stepping motor;

a sensor for detecting a stop position of the stepping motor;

an updown counter for outputting a count corresponding to a position of a rotor of the stepping motor;

a ROM for storing data on an excitation signal corresponding to the count of the updown counter;

a digital-to-analog converter for converting the data of the ROM into a voltage signal;

a drive amplifier for amplifying the voltage signal of the digital-to-analog converter so as to drive the stepping motor;

a NAND circuit which seeks a non-conjunction of a sensor signal from the sensor and a signal outputted, when the count of the updown counter is "0", by the updown counter so as to output a mask signal; and an AND circuit which seeks a logical product of the mask signal of the NAND circuit and a clock signal inputted from outside so as to output a drive clock signal to the updown counter.

* * * * *

UNITED STATES PATENT AND TRADEMARK OFFICE
CERTIFICATE OF CORRECTION

PATENT NO. : 5,900,711  Page 1 of 3
DATED : May 4, 1999
INVENTOR(S) : Masakazu SENOO It is certified that error appears in the above-identified patent and that said Letters Patent is hereby corrected as shown below:

On the title page,

Item 57  Abstract, line 2, after "with" insert --a--.

Column 1
line 19, after "with" insert --the--;
line 26, change "illustrating" to --, which illustrates--;
line 30, after ""200"" insert --,--;
line 32, after "after" insert --a--;
line 39, after "arises" insert --in--;
line 49, change "to" to --towards--;
line 56, after "with" insert --a--.

Column 2
line 17, change "This" to --These--;
line 19, delete "a";
line 46, change "associated operatively" to --operatively associated-- and after "with" insert --the--;
line 46, after "with" insert --the--;
line 50 after "signal" insert --,--;
line 56, after "9" insert --,--;
line 65, after "," insert --the--.

UNITED STATES PATENT AND TRADEMARK OFFICE
CERTIFICATE OF CORRECTION

PATENT NO. : 5,900,711                                  Page 2 of 3

DATED : May 4, 1999

INVENTOR(S) : Masakazu SENOO

It is certified that error appears in the above-identified patent and that said Letters Patent is hereby corrected as shown below:

Column 3,     line 1, after "after" insert --a--;

line 4, after "outputs" insert --,-- and after "6" insert --,--;

line 23, after "stop" insert --the--;

line 28, after "gained" insert --in--.

Column 4,     line 6, after "with" insert --a--;

line 7, change "the" to --said--;

line 8, change "the" to --said--;

line 11, change "the" to --said--;

line 13, change "the" to --said--;

line 14, change "the" to --said--;

line 16, change "the" to --said--;

line 17, change "the" to --said--;

line 20, change "the" to --said--;

line 21, change "the" to --said-- (both occurrence);

line 24, change "the" to --said--;

UNITED STATES PATENT AND TRADEMARK OFFICE
CERTIFICATE OF CORRECTION

PATENT NO. : 5,900,711
DATED : May 4, 1999
INVENTOR(S) : Masakazu SENOO

It is certified that error appears in the above-identified patent and that said Letters Patent is hereby corrected as shown below:

Column 4, line 25, change "the" to --said--.

Signed and Sealed this

Ninth Day of January, 2001

Attest:

Q. TODD DICKINSON

*Attesting Officer*    *Commissioner of Patents and Trademarks*